United States Patent [19]
DiFilippo et al.

[11] Patent Number: 4,738,423
[45] Date of Patent: Apr. 19, 1988

[54] GENERIC BEVERAGE CONTAINER HOLDER

[75] Inventors: Mike DiFilippo, Roseville; Dave N. Grabowski, Rochester Hills; James D. Kavanaugh, Dearborn Heights; Donald S. Rawlings, Northville, all of Mich.

[73] Assignee: Chivas Products Limited, Sterling Heights, Mich.

[21] Appl. No.: 4,994

[22] Filed: Jan. 20, 1987

[51] Int. Cl.⁴ ............................................. A47K 1/09
[52] U.S. Cl. ............................ 248/311.2; 248/523; 248/291; 248/240.1
[58] Field of Search ............... 248/311.2, 313, 523, 248/242, 298, 316.3, 316.2, 310, 291, 240.1

[56] References Cited

U.S. PATENT DOCUMENTS

| | | | |
|---|---|---|---|
| 2,667,317 | 1/1954 | Trebules | 248/291 X |
| 2,926,879 | 3/1960 | Dietrich | 248/311.2 |
| 3,405,899 | 10/1968 | Trachtenberg et al. | 248/313 X |
| 3,637,184 | 1/1972 | O'Brien | 248/311.2 X |
| 3,734,439 | 5/1973 | Wintz | 248/311.2 X |
| 3,784,142 | 1/1974 | O'Brien | 248/311.2 |
| 4,071,175 | 1/1978 | Wagnon | 248/311.2 X |
| 4,213,649 | 7/1980 | Sell | 248/311.2 X |

Primary Examiner—Ramon S. Britts
Assistant Examiner—Karen J. Chotkowski
Attorney, Agent, or Firm—Townsend and Townsend

[57] ABSTRACT

A generic beverage container holder for use within a vehicle includes a housing mountable beneath the dashboard and a frame slidably mounted to the housing for movement between retracted and extended positions. An opening is defined within the frame to accommodate beverage containers such as mugs, cans and cups. A U-shaped support is pivotally mounted to and beneath the frame and is spring biased towards a vertical attitude beneath the container opening when the frame is extended. When the frame is retracted the support automatically folds against the frame for storage. The container is centered by three pivotal spring biased centering tabs mounted about the container opening. Containers over a range of sizes are properly positioned within the container opening to keep this container supported by the U-shaped support and prevent the container from moving around within the opening.

4 Claims, 2 Drawing Sheets

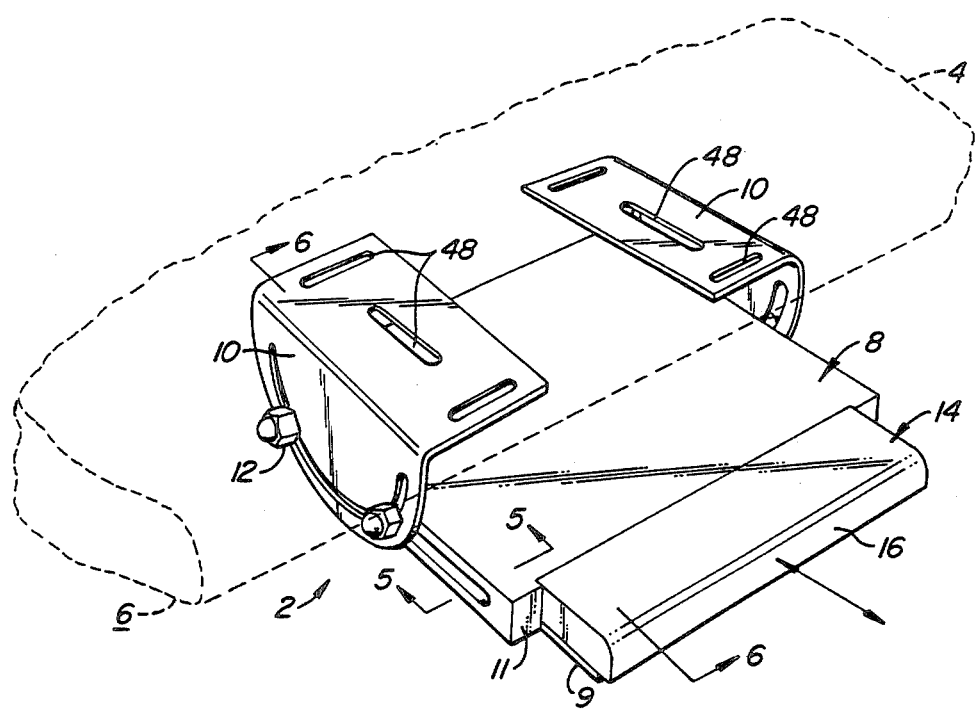
FIG._1.
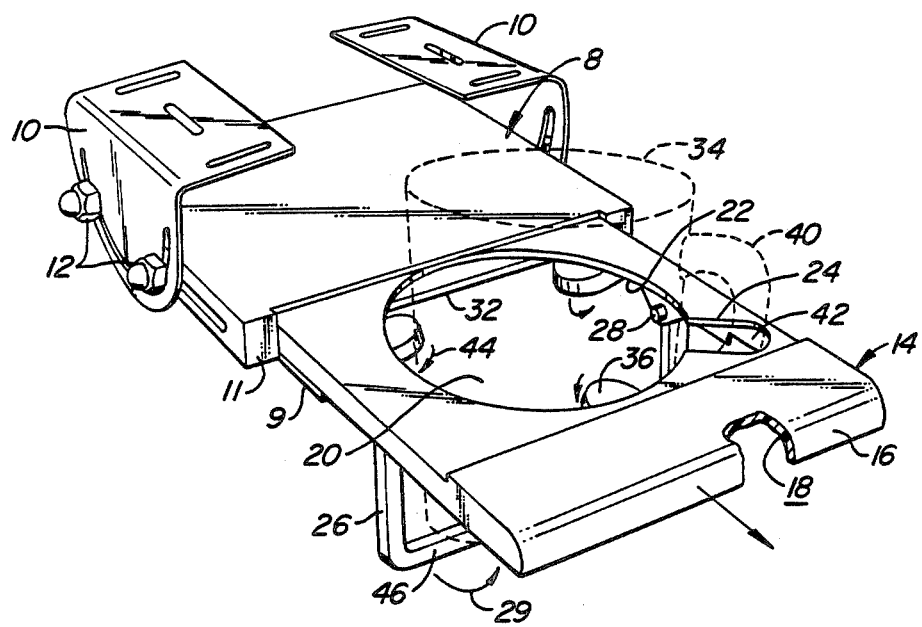
FIG._2.

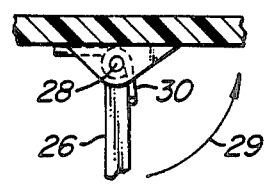
FIG._3.
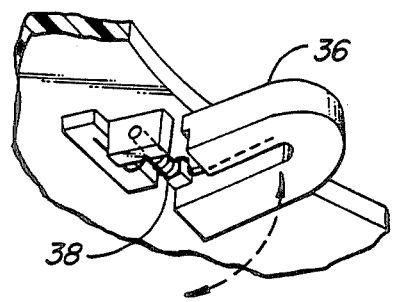
FIG._4.
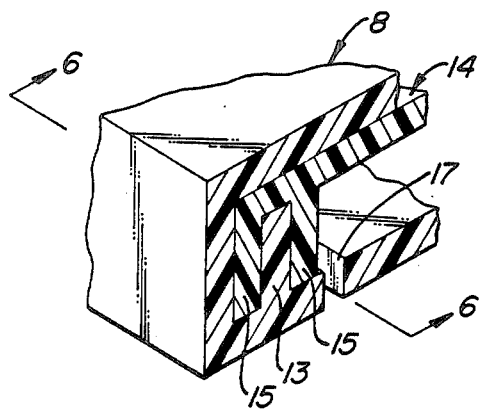
FIG._5.
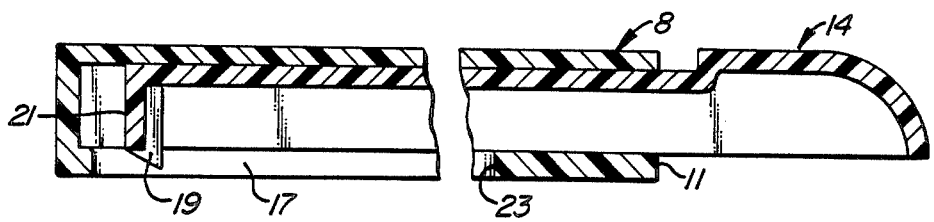
FIG._6.

GENERIC BEVERAGE CONTAINER HOLDER

BACKGROUND OF THE INVENTION

Both drivers and passengers often drink beverages while in a motor vehicle. One constant problem is where to put the cup, mug, can or other beverage container. Some automobiles have horizontal surfaces which can be used to support a beverage container. However, while the vehicle is is motion such a perch can be less suitable.

In response to this numerous devices have been developed to properly support a beverage container, especially while the vehicle is in motion. Some of these are in the form of a circular basket with a generally U-shaped lip at the top which engages the window opening. Others are meant to be supported on the floor of the vehicle, typically on the drive shaft hump. These floor-supported container supports have the obvious disadvantage of being in the way when not needed. Many holders are manufactured to accommodate a conventional soft drink can; coffee mugs often do not fit within their openings. Therefore even with conventional beverage container holders, the user is often left with no satisfactory place for his or her beverage container.

SUMMARY OF THE INVENTION

The present invention is directed to a generic beverage container holder, particularly suited for use with motor vehicles, which accommodates a range of sizes of beverage containers and which retracts out of the way when not needed.

The generic container holder includes a housing mountable to a support surface and a frame movably mounted to the housing. The housing is typically mounted to a support surface at the underside of the dashboard of a motor vehicle. The housing and frame are preferably slidably mounted to one another so that the frame is out of sight when its retracted, storage position within the housing. When the frame is pulled to its extended, use position the frame exposes a container receiving opening. The opening defined by the frame is typically circular to accommodate conventional coffee mugs, soft drink cans, paper or plastic cups and so forth.

In the preferred embodiment, a U-shaped container support is pivotally mounted to and suspends from the frame. The U-shaped support is spring biased to assume a generally vertical attitude so that the bight of the U is positioned beneath the center of the container opening when the frame is in the extended, use position. When the frame is retracted to its storage position, the U-shaped support automatically folds into the frame for compact storage.

The mug, cup or other container is positioned, preferably centered, within the container opening by movable tabs mounted to the frame adjacent the periphery of the container opening. These tabs are spring biased to inwardly directed positions. When a container the same size as the container opening is placed into the container opening, pivotal tabs are fully deflected, preferably downwardly, out of the way by the container. However, when a somewhat smaller container is placed in the container opening the tabs resiliently engage the sides of the container thus positioning the container within the container opening. In this way containers over a range of sizes of containers are properly positioned within the container opening to keep the container supported by the U-shaped support. The tabs also help prevent the container from moving around within the opening while the vehicle is moving. The smallest container useable with the invention is preferably the smallest container which can be placed anywhere in the container opening and still be supported by the container support.

A key feature of the invention is the use of the movable, pivotal tabs (or like members) to engage the sides of the beverage container and to urge the beverage container a stable position within the container receiving opening. The preferred embodiment uses three pivotal tabs which resiliently direct the container towards a central position within the container opening. Other positioning schemes, for example using two radially deflectable members (each having a tapered upper surface) to direct the container towards one side of the container opening, could be used as well.

Other features and advantages of the present invention will appear from the following description in which the preferred embodiment has been set forth in detail in conjunction with the accompanying drawings.

BRIEF DESCRIPTION OF THE DRAWINGS

FIG. 1 is a perspective view of a generic container holder shown in the retracted, storage position and mounted beneath the dashboard of a vehicle, the dashboard shown in dashed lines.

FIG. 2 is a perspective view of the container holder of FIG. 1 in the extended, use position with a coffee mug shown in dashed lines.

FIG. 3 is a partial side view of the upper end of the U-shaped support at its pivot.

FIG. 4 is an enlarged perspective view of one of the pivotal tabs shown in FIG. 2 as viewed from beneath.

FIG. 5 is a partial cross-sectional isometric view taken along line 5—5 of FIG. 1 illustrating the guides.

FIG. 6 is a side cross-sectional view taken along line 6—6 of FIG. 1 and indicated at line 6—6 in FIG. 5.

DETAILED DESCRIPTION OF THE PREFERRED EMBODIMENT

At FIG. 1 a generic container holder 2 is shown positioned beneath the dashboard 4 of a motor vehicle (not shown) as it would be mounted to the downwardly facing support surface 6 of the dashboard.

Referring now also to FIG. 2, container holder 2 shown to include a housing 8 mountable to support surface 6 of dashboard 4 by a pair of pivot brackets 10. By adjusting acorn nuts 12 on pivot brackets 10 the appropriate angular inclination of housing 8 can be achieved.

A frame 14 is slidably mounted to housing 8 to move between its retracted position of FIG. 1 and its extended or use position of FIG. 2. Housing 8 and frame 14 include complementary guides 13, 15, seen in FIG. 5, to promote the proper sliding movement of frame 14 within housing 8. A portion 9 of guide 13 extends past the front 11 of housing 8 to provide additional support for frame 14 when extended. The outer edge 16 of frame 14 has a curved grasping surface 18 by which the user can pull frame 14 from housing 8 when desired. Housing 8 has a slot 17, seen in FIGS. 5 and 6, within which an angled stop 19, positioned at and depending from the back 21 of frame 14, moves. Stop 19 engages the end 23 of slot 17 to keep the user from inadvertently removing frame 14 completely from housing 8. Frame 14 also includes a container receiving opening 20 defined by a generally circular edge 22, edge 22 having a cutout portion 24 to accommodate, for example, coffee mug handles as discussed below.

A U-shaped support 26 is pivotally mounted to frame 14 at pivots 28 to move between a generally vertically oriented support position of FIG. 2 and a generally horizontal, storage position (not shown). Support 26 lies adjacent frame 14 when pivoted in the direction of arrow 29 to assume its storage position. Support 26 is pivotally biased towards the vertical support position of FIG. 2 by a spring 30. (See FIG. 3.) U-shaped support 26 is pivoted in the direction of arrow 29 when frame 14 is moved to the retracted position of FIG. 1 by support 26 engaging bottom 32 of housing 8.

FIG. 2 shows a coffee mug 34 in dashed lines centrally positioned within opening 20 by three pivot tabs 36. Pivot tabs 36, as shown in FIG. 4, are pivotally biased towards the inwardly extending position of FIGS. 2 and 4 by springs 38. As is illustrated in FIG. 2, the handle 40 of coffee mug 34 fits within the opening 42 defined by cutout portion 24 of edge 22. Pivot tabs 36 engage the side of coffee mug 34 to properly (in this case centrally) position coffee mug 34 within opening 20. If coffee mug 34 were the same size as or somewhat smaller than opening 20, placing coffee mug 34 within opening 20 would cause pivot tabs 36 to be deflected in the direction of arrows 44. Even if coffee mug 34, or some other beverage container, were small enough so that it would not contact all three pivotal tabs 36, any pivot tabs 36 which were contacted would still have the tendency to partially position the beverage container to the desired location thus helping to ensure proper support by the bight 46 of U-shaped support 26.

Generic container holder 2 is secured to surface 6, or some other appropriate support surface, typically using openings 48 in pivot brackets 10 and appropriate screws (not shown). Other securement methods, including clips or adhesives, could be used as well. Nuts 12 are loosened to allow housing 8 to be positioned horizontally, assuming that it is desired. Nuts 12 are then retightened.

When not in use, frame 14 is pushed into housing 8 to assume its retracted position of FIG. 1. In this position container holder 2 is out of the way with frame 14 retracted and U-shaped support 26 pivoted up and within housing 8. When needed, the user grasps surface 18 to extend frame 14 to the use position of FIG. 2. Spring 30 automatically biases U-shaped support 26 towards its vertical, container supporting position of FIG. 2. A coffee mug 34, or some other beverage container, is then placed within opening 20, coffee mug 34 being guided toward a central location within opening 20 by pivot tabs 36 engaging the sides of the mug. By this pivotal engagement, mug 34 is not only properly positioned within opening 20 but also is substantially prevented from moving around within opening 20 while the vehicle is moving, thus reducing spills.

Modification and variation can be made to the disclosed embodiment without departing from the subject of the invention as defined in the following claims. For example, frame 8 could be pivotally, rather than slidably, mounted to housing 8. Support 26 need not be U-shaped; a planar surface, rather than bight 46, could be provided for the support of the beverage containers.

We claim:

1. A generic container holder useable with containers over a range of lateral sizes, for mounting to a surface comprising:
   a housing mountable to the surface;
   a frame slidably mounted to the housing for movement between a retracted position, adjacent the housing, and an operational position, partially spaced apart from the housing, the frame having a portion defining a central open area, the central open area sized for receipt of the container of the largest lateral size;
   a bottom support, pivotally mounted to and depending from the frame, for movement between a container support position, centrally beneath the central open area when the frame is in the operational position, and an inoperative position adjacent the frame;
   means for biasing the bottom support towards the container support position so the bottom support automatically assumes the container support position when the frame is in the operational position;
   means for automatically moving the bottom support from the container support position to the inoperative position during movement of the frame from the operational position to the retracted position;
   a part of the bottom support positioned centrally beneath the central open area when the frame is in the operational position, so a chosen one of the containers placed in the central open area will be supported vertically by the bottom support;
   container engaging members, pivotally mounted to the frame for movement between deflected positions, substantially external of the central open area, and extended positions, extending into the central open area; and
   springs for biasing the movable members toward their extended positions, the movable members engaging the chosen one of the containers so to position the chosen one of the containers within the central open area.

2. The container holder of claim 1 further comprising a support bracket for movably mounting the housing to the surface.

3. The container holder of claim 1 wherein the frame portion is generally circular.

4. The container holder of claim 3 wherein the frame portion includes a radially extending slot portion sized for receipt of a handle on a container.

* * * * *